United States Patent [19]

Lamond et al.

[11] 4,138,471
[45] Feb. 6, 1979

[54] PROCESS FOR REDUCING THE POLYCYCLIC AROMATIC HYDROCARBON CONTENT OF CARBON BLACK

[75] Inventors: Trevor G. Lamond; John L. Wells, both of Borger, Tex.

[73] Assignee: J. M. Huber Corporation, Locust, N.J.

[21] Appl. No.: 774,091

[22] Filed: Mar. 3, 1977

Related U.S. Application Data

[63] Continuation-in-part of Ser. No. 691,740, Jun. 1, 1976, abandoned.

[51] Int. Cl.$^2$ ............... C09C 1/56; C01B 31/00; C01B 31/02
[52] U.S. Cl. .................... 423/460; 423/445; 423/461
[58] Field of Search .............. 423/460, 461, 445; 260/42.47

[56] References Cited

U.S. PATENT DOCUMENTS

| | | | |
|---|---|---|---|
| 2,005,022 | 6/1935 | Damon | 423/460 |
| 2,707,672 | 5/1955 | Sweitzer | 423/460 |
| 2,707,674 | 5/1955 | Sweitzer | 423/460 |
| 3,130,133 | 4/1964 | Loevenstein | 423/461 |
| 3,993,739 | 11/1976 | Vanderveen | 423/460 |
| 4,075,157 | 2/1978 | Johnson | 423/460 |

FOREIGN PATENT DOCUMENTS 937841  9/1963  United Kingdom ............ 423/445

Primary Examiner—O. R. Vertiz
Assistant Examiner—Gregory A. Heller
Attorney, Agent, or Firm—Ernest A. Schaal; Harold H. Flanders

[57] ABSTRACT

The amount of polycyclic aromatic hydrocarbons on the surface of a carbon black can be reduced below 2 ppb by heat treating the carbon black in a fluidized bed. Dried furnace carbon black pellets are charged in a fluid bed unit and preheated. The pellets are then fluidized with air, with the temperature of the bed between 1150° F and 1850° F for 5 to 40 minutes. The carbon black is then quenched and recovered.

3 Claims, No Drawings

PROCESS FOR REDUCING THE POLYCYCLIC AROMATIC HYDROCARBON CONTENT OF CARBON BLACK

CROSS-REFERENCES TO RELATED APPLICATIONS

This application is a continuation-in-part of co-pending U.S. application Ser. No. 691,740 filed June 1, 1976, now abandoned.

BACKGROUND OF THE INVENTION

1. Field of the Invention

In general, the present invention relates to a process for purifying carbon blacks. More specifically it relates to heat treating carbon blacks to reduce the levels of polycyclic aromatic hydrocarbons on the surface of the carbon black.

2. Description of the Prior Art

Carbon blacks contain a low level of polynuclear aromatic hydrocarbons (PNA) on their surface which are believed to be carcinogenic. Because of this, the FDA has restricted the use of carbon blacks in applications which involve contact with food or skin (21 CFR S121.2562). Industry has tried to reduce these PNA levels by modifying the carbon black process by using high temperatures in the furnace and delaying the quench. This reduces the PNA levels from a range of 100 to 150 ppm down to levels of 25 to 40 ppm. The present invention brings down the PNA levels to below 2 ppb.

The concept of purifying carbon black is old in the art. In U.S. Pat. No. 1,303,362, Mott purifies lampblack by heating it in the presence of carbon tetrachloride at temperatures of 1472–1832° F.

In U.S. Pat. No. 2,643,182 carbon black is purified by Williams by suspending the carbon black in hot combustion gases and bringing the temperature up to 1562–3632° F for 0.1 – 5.0 seconds.

In British Pat. No. 937,841, the carbon black in a slurry is purified by mixing into the carbon black slurry a volatile liquid which is immiscible with water and has a higher adhesion tension than water for the carbon black. The water is then drained off, and the volatile liquid is evaporated off, leaving a purer carbon black.

Williams uses a dilute solution of $NH_4NO_3$ in U.S. Pat. No. 3,512,935 to purify carbon black.

A different technology has developed for reducing the pH of carbon black. The low pH values (2-5) observed for channel blacks arise from the carboxyls, phenols, lactones and other acidic oxides present on the surface. Furnace blacks have considerably higher pH values, generally in the range of 7-10, due to the absence of appreciable amounts of these acidic surface oxides.

Considerable interest has been generated in introducing acidic surface oxides onto the surface of furnace blacks to prepare "channel-like" materials. Such modifications have been accomplished by reacting furnace blacks with nitric acid, nitrous oxide, ozone, etc. and with oxygen or air at temperatures above ambient. The best pH reduction with air oxidation occurs in the temperature range from 400 – 750° F. These temperatures are too low to prepare PNA-free blacks. The use of higher temperatures (above 750° F) are not as successful at pH reduction due to the low thermal stability of the acidic oxides at these temperatures.

Cines (U.S. Pat. No. 2,682,448), oxidizes carbon black by exposing it in a tumbling drum to an oxygen-containing gas (2½ – 5%) for 16 minutes to 2 hours, at temperatures of 400 – 1200° F.

Sweitzer (U.S. Pat. No. 2,707,674), oxidizes carbon black in a shallow bed for 50 minutes at 650 – 950° F.

A fluidized bed is used by Pollock in U.S. Pat. No. 3,247,003 to oxidize the carbon black. Ozone is used as the oxidizing agent at temperatures of 650 – 1000° F for 1 hour. (The use of fluidized beds for processes dealing with carbonous material is outlined by Odell in U.S. Pat. No. 1,984,380.).

Daniell and Peterson (U.S. Pat. No. 3,279,935), use peroxide with air to oxidize carbon black in a fluidized bed maintained at 350 – 600° F.

Johnson, Logan and Larson (U.S. Pat. No. 3,318,720), impregnate carbon black with a compound such as hydroxide, nitrates, etc., prior to air oxidation in a fluidized bed at a temperature of 550 – 950° F.

In U.S. Pat. No. 2,714,055, Cines used the technology developed for reducing pH in U.S. Pat. Nos. 2,682,448 and 2,707,674 to remove tar from carbon black at temperatures of 400° F to 1200° F.

In U.S. Pat. No. 3,411,928 Dollinger and Joy oxidize furnace black by air in a fluidized bed at 550 – 825° F for 30 minutes to 21 hours to make it like channel black.

Activated carbons do not have high PNA levels, but these carbons are more expensive and have high surface area, high porosity, high moisture absorption which gives problems in compounding rubber or plastic. Also, if the activated carbon is made from coal, it does not have the reinforcing properties, or the coloring properties and lacks the purity in inorganic metals, ash and inorganic salts that regular carbon black has.

None of the prior art has been successful in making a carbon black with the proper coloring properties and reinforcing properties that has PNA levels below the ppm range.

SUMMARY OF THE INVENTION

It is an object of this invention to provide a method of reducing the PNA levels in carbon black to undetectable levels while not significantly changing the other properties of the carbon black.

Other objects and a fuller understanding of the invention may be had by referring to the following description and claims.

We have now discovered that the PNA levels in carbon black could be reduced to undetectable levels by employing a modification of the process developed for decreasing pH. This heat treatment destroys the PNA by distilling them off the surface and by transforming it into solid carbon. If oxygen is present in the fluidizing fluid, the PNA is also destroyed by oxidation. The carbon black is pelletized using little or no binder, then charged in a fluid bed and preheated. The bed of pellets is then fluidized for 5 – 165 minutes at a temperature between 1150 – 1850° F, then the carbon black is quenched and recovered.

DESCRIPTION OF THE PREFERRED EMBODIMENTS

The starting material for this process can be channel blacks, thermal blacks or furnace blacks. Furnace black is preferred because it is inexpensive.

The present invention is carried out on pelleted black because the throughputs must be low when unpelleted blacks are used to prevent excessive product losses.

The pelleting of carbon black is well known and conventional as is their production and drying, see for example U.S. Pat. No. 3,075,829. Pelletization of such materials may be effected with or without binders. Suitable binders are known to be molasses, sugar, pitch, lignin, sulfonated lignin and other polymers.

If binders are employed in the formation of pellets for use in the process of the present invention, care should be taken to ensure that the level of binder utilized is sufficiently low, less than 5% by weight of the pellet, so that the binder does not effectively block the spaces between particles of the pellet and thereby prevent uniform treatment.

The finely divided form of the particles of carbon black allows the employment of rapid treatment rates while achieving substantially uniform treatment throughout the carbon black pellets. The pelletized form of the carbon black allows the use of a fluidized bed and its accompanying high treatment rates without extensive loss of the carbon black from the fluidized bed as emissions.

Pellets of a furnace carbon black are removed from a conventional carbon black production process and introduced into any of the well known and conventional fluidizing units suitable for producing a fluidized bed of such pellets. The preferred place to remove the carbon black pellets from the conventional production process would be after the dryer output.

The pellets in the fluidizing unit are preheated to approximately 500° F by combustion gases or other well known means, as desired. The air or off gases from other fluid beds in the process may be used to preheat the pellets as desired.

A fluid is then introduced to fluidize the preheated pellets. This fluid does not need to contain oxygen, but preferably it should contain at least 10% oxygen. The presence of oxygen in the fluid helps destroy the PNA by oxidation. In the preferred embodiment of the present invention, the fluid is either air, air mixed with other gases, or combustion gases containing free air.

The fluidized pellets are heat treated by the flow fluid at a temperature from 1150 – 1850° F for a period of from 5 minutes to 165 minutes, then the carbon black is quenched and recovered. The preferred time period is 5 to 40 minutes. Lower temperatures require longer times. If the temperature is too high, around 2400° F, one gets graphitization of the carbon black which reduces its reinforcing properties.

A fuller understanding of the present invention may be had by referring to the following examples.

EXAMPLES I, II, III, IV, V and VI

A five foot internal diameter fluid bed unit was connected to a source of combustion gas and to a source of air. Pelletized N-375 and N-339 furnace carbon black was added to the fluid bed unit and preheated to 500° F for 30 minutes by the flow of combustion gases. Enough material was added to provide the bed depth specified below. Air or combustion gases was then used to fluidize the bed. In all examples where air was employed, the furnace refractory through which the air passed was used as a preheater. The residence time of treatment was as set forth below. The iodine adsorption number is employed as an indication of surface area, expressed as milligrams of $I_2$ adsorbed per gram of carbon measured in accord with ASTM Method D1510. The above properties were measured following quenching of the carbon product at the end of each run.

Analysis of selected samples of the above examples for carcinogenic PNA by benzene extraction of the polycyclic aromatic hydrocarbons followed by thin layer chromatography, paper partition chromatography, gas-Liquid chromatography, and UV-VIS absorption spectroscopy with specific analysis for benzo (a) pyrene, dibenz (a,h) anthracene and 7,12-dimethyl-benz (a) anthracene indicated less than 2 ppb of any of the above compounds. The furnace black from which the product was derived had 3.0 ppm of benzo (a) pyrene.

Other analysis has shown the surface of furnace blacks to have relatively large amounts of benzo (ghi) perylene, anthanthrene, coronene, benzo (e) pyrene, benzo (a) pyrene (aka 3,4-benzpyrene and 3,4-benzopyrene), dibenz (a,h) anthracene (aka 1,2,5,6 - dibenzanthracene) and 7,12 - dimethylbenz (a) anthracene (aka 9,10-dimethyl - 1,2 - benzanthracene and 9,10 - dimethylbenzanthracene). By means of the present invention it is possible to reduce the level of the above compounds present on the black to a level below the presently detectable limit of 2 ppb.

EXAMPLES VII and VIII

Occasionally, it is important to produce carbon blacks with no detectable levels of PNA without significantly increasing the surface area and porosity of the black. This can be done by fluidizing the black in combustion gases containing less than 2.5% and more preferably no free oxygen. This is illustrated in the following examples.

EXAMPLE VII: Pelletized N-660 furnace black with a PNA level of 113 ppm and a BET surface area of 31.3 m²/g was heated to 1300° F in hot combustion gases containing 2 mole percent of free oxygen. After 13 minutes of treatment, there was no detectable PNA at the 2 ppb level, and the surface area was 31.9 m²/g. After 26 minutes of treatment, the surface area was 32.4 m²/g.

EXAMPLE VIII: Pelletized N-347 furnace black with a PNA level of 3 ppm and a BET surface area of 83.8 m²/g, was charged to a 5 foot diameter bed and fluidized with 1200° F combustion gases containing 0.15 mole percent of free oxygen. A sample collected at 15 minutes had no detectable levels of PNA and a surface area of 85.2 m²/g.

| | | EXAMPLES I, II, III, IV, V and VI | | | | | | |
|---|---|---|---|---|---|---|---|---|
| Example No. | Bed Depth, feet | Thruput, SCFM Air | Gas | Oxygen % | Bed Temp. °F | Treatment Time Minutes | Iodine No. mg/g | H | ASTM Grade |
| I | 3 | 450 | 31 | 6.4 | 1150 | 165 | 344 | 7.4 | N-339 |
| II | 3 | 420 | 21 | 11.2 | 1300 | 110 | 408 | 8.7 | N-339 |
| III | 3 | 450 | 0 | 21.0 | 1600 | 60 | 431 | 9.7 | N-339 |
| IV | 2 | 700 | — | 3.5 | 1150 | 75 | 265 | 7.5 | N-339 |
| V | 3 | 620 | — | 12.1 | 1650 | 50 | 445 | 9.6 | N-339 |
| VI | 3 | 700 | 0 | 21.0 | 1850 | 30 | 464 | 10.2 | N-339 |

EXAMPLE IX

The above examples illustrate the use of this invention in the batch mode. Example IX shows the use of this invention in the continuous mode.

EXAMPLE IX: Pelletized N-744 black was added at the rate of 1 lb/min to a 10 inch fluidized bed equipped for continuous charge/discharge, to give a 20 minute residence time. The fluidizing gas was preheated air and the bed temperature was 1000° F. The PNA level of the black was reduced from 131 ppm to undetectable at the 2 ppb level, its surface area increased from 31.2 to 81.4 m$^2$/g.

Significant reductions in the level of carcinogens may be obtained in treatments as short as 5 minutes.

In summary, fluid bed heat treatment of a furnace carbon black pelletized without significant obstruction of the interparticulate spaces of the pellet by fluidization with air or combustion gases at temperatures between 1150° F and 1850° F and retention times of from 5 minutes to 165 minutes will yield a furnace carbon black having a level of polycyclic aromatic hydrocarbons less than 2 micrograms per kilogram of carbon.

We claim:

1. A method of purifying a furnace black to reduce the level of polycyclic aromatic hydrocarbons to less than 2 micrograms per kilogram of furnace black, comprising the steps of:
   (a) pelletizing said furnace black with less than 5% of binder so that there is no significant obstruction of the interparticulate spaces of the resulting pellets;
   (b) charging a fluid bed unit with said furnace black;
   (c) preheating said furnace black to about 500° F for about 30 minutes;
   (d) fluidizing said furnace black with a flow of fluid containing at least 10% oxygen selected from the group consisting of air, air mixed with other gases, and combustion gases containing free air;
   (e) maintaining the temperature of the fluidized bed from 1150° F for a period of time from 5 minutes to 165 minutes to heat treat said furnace black;
   (f) quenching and recovering said furnace black.

2. A method according to claim 1 wherein the time period in step (e) is 5 to 40 minutes.

3. A method according to claim 1 wherein the binder is selected from the group consisting of molasses, sugar, pitch, lignin, sulfonated lignin and other polymers.

* * * * *

UNITED STATES PATENT AND TRADEMARK OFFICE
CERTIFICATE OF CORRECTION

PATENT NO. : 4,138,471
DATED : February 6, 1979
INVENTOR(S) : Trevor G. Lamond and John L. Wells It is certified that error appears in the above-identified patent and that said Letters Patent are hereby corrected as shown below:

Columns 3-4, in the table after line 55, instead of "H", the heading for the ninth column should be -- pH --.

Column 6, line 16, following "1150°F", the following should be inserted: -- to 1850°F --.

Signed and Sealed this

First Day of May 1979

[SEAL]

Attest:

RUTH C. MASON
Attesting Officer

DONALD W. BANNER
Commissioner of Patents and Trademarks